United States Patent
Hewson

[11] 3,883,258
[45] May 13, 1975

[54] PLASTIC DOWEL PIN AND WOOD JOINT ASSEMBLY

[76] Inventor: Kenneth E. Hewson, 626 Colony Dr., Troy, Mich. 48084

[22] Filed: May 24, 1973

[21] Appl. No.: 363,349

[52] U.S. Cl............................. 403/298; 52/753 E
[51] Int. Cl............................................ F16b 13/00
[58] Field of Search .......... 403/298, 292, 293, 297, 403/295; 52/753 E

[56] References Cited
UNITED STATES PATENTS

| | | | |
|---|---|---|---|
| 1,287,678 | 12/1918 | Hall | 403/292 |
| 2,328,823 | 9/1943 | MacKenzie | 52/753 E |
| 3,104,430 | 9/1963 | Badali | 403/13 |
| 3,736,834 | 6/1973 | MacDonald | 52/753 E |

FOREIGN PATENTS OR APPLICATIONS

| 766,815 | 1/1957 | United Kingdom | 403/292 |
|---|---|---|---|

*Primary Examiner*—Andrew V. Kundrat
*Attorney, Agent, or Firm*—Basile & Weintraub

[57] ABSTRACT

A dowel pin for connecting two wooden members, each of which have aligned dowel holes. The dowel pin is preferably fabricated from a plastic material and comprises an elongated body having a plurality of longitudinally aligned truncated cone sections, extending from the midsection of the body, the conical surfaces of the cone sections being tapered toward the opposite ends of the pin body. The larger circular base portion of the truncated cone sections at the opposite ends of the dowel pin body each have a diameter which is substantially equal to the diameter of the wooden member dowel hole within which the dowel pin is inserted. The larger diameter base of each successively, inwardly spaced truncated cone section has an outer diameter that is radially increased a predetermined increment above the outer diameter of the end cone sections. A longitudinal slot extending the full length of the pin permits the truncated sections to be inwardly compressed as the pin is inserted into the dowel hole with the resiliency of the pin material biasing the truncated cone sections outwardly into a locking engagement with the inner wall surface of the dowel hole.

2 Claims, 5 Drawing Figures

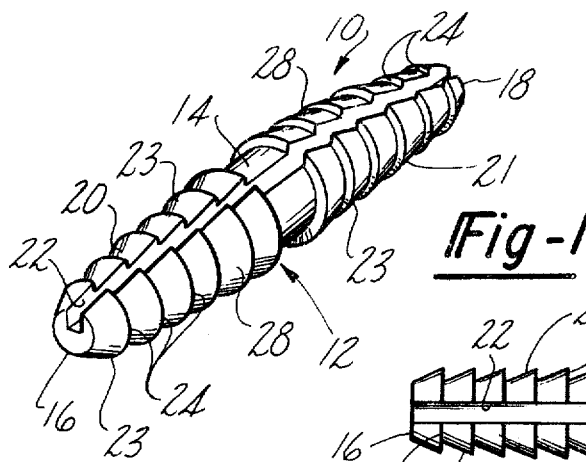
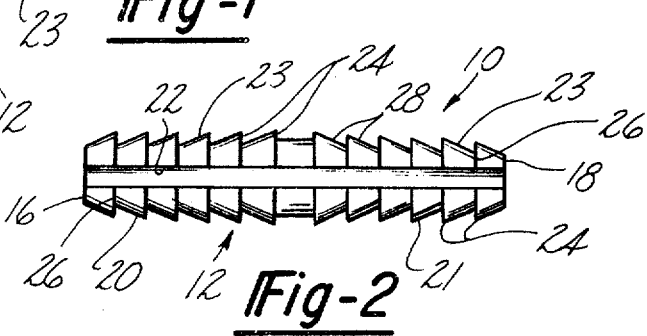
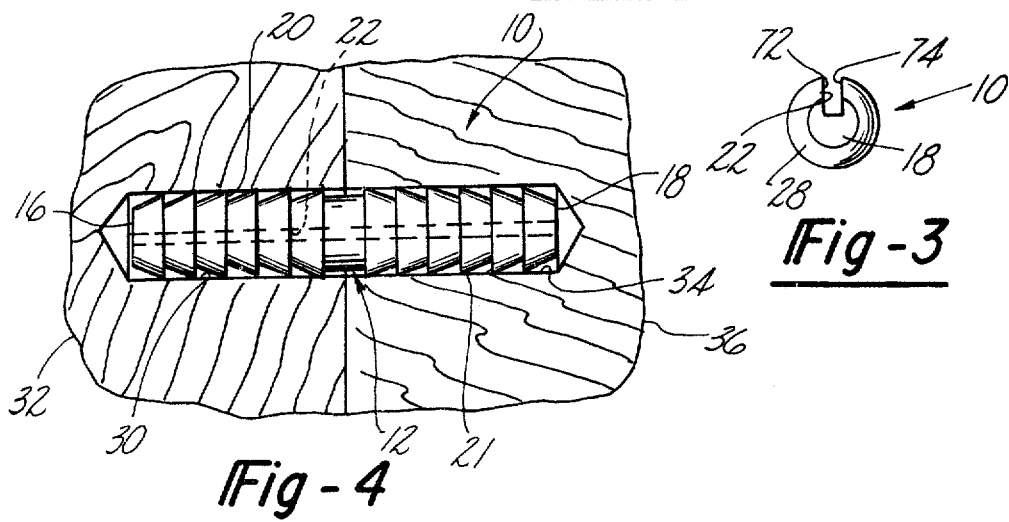
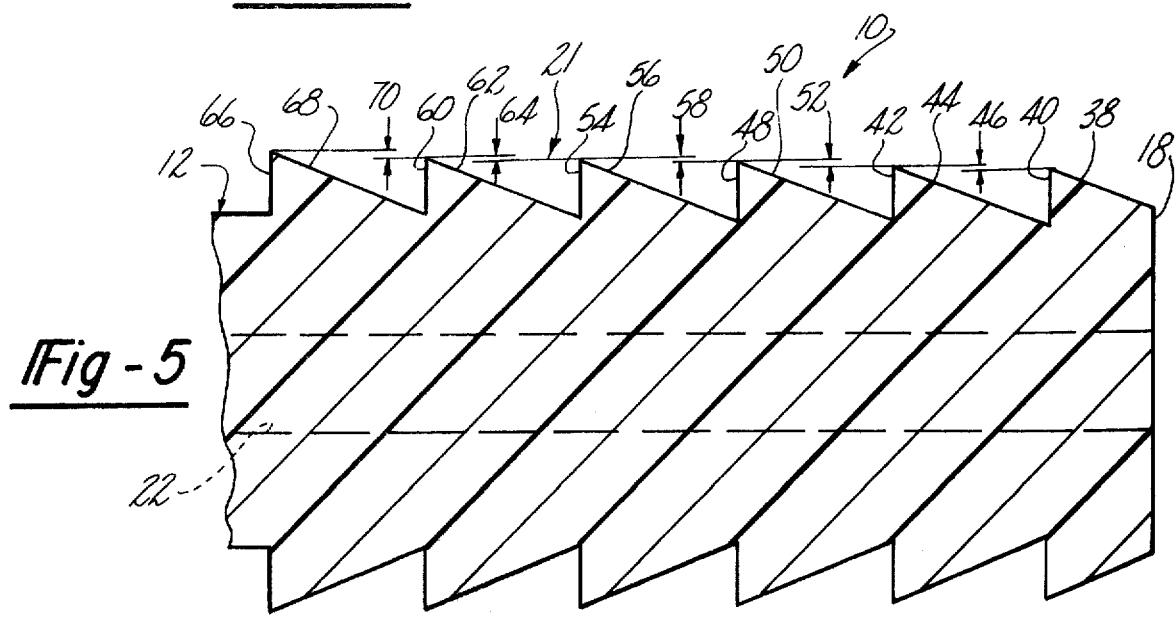

PLASTIC DOWELL PIN AND WOOD JOINT ASSEMBLY

BACKGROUND OF THE INVENTION

I. Field of the Invention

The present invention relates to dowel pins for joining two wooden members together and, in particular, to a dowel pin fabricated from a plastic material for joining two wooden members together without the need for an adhesive.

II. Description of the Prior Art

The use of dowel pins for joining two wooden members is well known and generally comprises the use of a wooden dowel pin that is inserted within dowel holes of the members that are adapted to be joined. Normally such dowel pins and wooden members are joined by means of an adhesive. Other dowel pins which are useful in joining two members are disclosed in U.S. Pat. Nos. 1,287,678, 2,499,146, 3,104,430, 3,405,592, 3,438,659 and 3,676,898 and German Pat. No. 421,406. In the aforementioned patents, various types of dowel pin arrangements are disclosed and generally comprise a dowel pin having annular tooth-like locking flanges extending from the opposite ends toward the mid-section of the pin with the flanges having tapered surfaces sloping inwardly in opposite directions to facilitate the insertion of a dowel pin. The diameter, however, throughout the entire length of the dowel pin is uniform. Other patents disclose dowel pins having external locking flanges and internal flow passages for the distribution of an adhesive. Other patents disclose dowel pin structures using expandable tubular insert sleeves for the dowel holes in each member to be joined, while a dowel pin is driven into each of the dowel holes within the sleeve inserts, whereupon the dowel cooperates with the expandable insert sleeves to force them into the walls of the dowel hole to retain the members together.

Although the aforementioned patents disclose various means for joining two wooden members, none disclose a dowel pin made of a plastic material adapted to connect two wooden members together without the need for an adhesive.

SUMMARY OF THE INVENTION

The present invention which will be described subsequently in greater detail comprises a plastic dowel pin having a plurality of longitudinally spaced locking teeth, each of which has an outer diameter that is increased by a predetermined increment over the outer diameter of the locking teeth at the opposite ends of the dowel pin.

It is therefore an object of the present invention to provide a new and improved dowel pin which is preferably fabricated from a plastic material.

It is a further object of the present invention to provide such a dowel pin which will join two wooden members without the need for an adhesive.

Other objects, advantages and applications of the present invention will become apparent to those skilled in the art of dowel pins and wood joint assemblies when the accompanying description of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which:

FIG. 1 is a perspective view of a dowel pin constructed in accordance with the principles of the present invention;

FIG. 2 is a plan elevational view of the dowel pin illustrated in FIG. 1;

FIG. 3 is a side elevational view of the dowel pin illustrated in FIG. 1;

FIG. 4 is a section through the joint of two wooden members fastened by means of the dowel pin illustrated in FIG. 1; and FIG. 5 is an enlarged fragmentary cross-sectional view of the dowel pin illustrated in FIG. 1.

DESCRIPTION OF THE PREFERRED EMBODIMENT

Referring now to the drawing and, in particular, to FIGS. 1, 2 and 3 wherein there is illustrated one example of the present invention in the form of a dowel pin 10 comprising an elongated body 12 on which there is formed, from the mid-section 14 to the opposite ends 16 and 18, a plurality of longitudinally spaced locking teeth 20 and 21, respectively. A slot 22 extending the full length of the body 12 from the end 16 to the end 18 cuts through the teeth 20 and 21 and mid-section 14 of the pin 10.

As can best be seen in FIGS. 1 and 2, each of the teeth 20 and 21 is formed by a truncated conically shaped section 23 with the larger diameter base 24 of each section 23 being integrally connected with and forming a part of the smaller diameter bases 26. The conical surfaces 28 of each of the truncated cone sections 23 taper inwardly and toward the opposite ends 16 and 18 of the pin 10.

The outer edge defined by the large diameter bases 24 form the wood engaging surfaces of the pin 10 when the same is inserted in a dowel bore, such as is illustrated in FIG. 4, wherein the end 16 is inserted in a dowel hole 30 of a wooden member 32, while the end 18 is inserted in a dowel hole 34 of a wooden member 36 to join the wooden members 32 and 36 in a manner similar to the joining of two wooden members by a conventional wooden dowel pin or a dowel pin such as those described in the aforementioned United States patents.

Referring to FIG. 5, wherein there is illustrated in cross-section, the teeth 21 disposed between the end 18 and the mid-section 14. It is to be understood that in the following description of the teeth 21 that the same are identical to the teeth 20 disposed between the end 16 and the mid-section 14 and that the description of the teeth 21 in FIG. 5 is applicable to the teeth 20.

The truncated cone section 38 formed at the end 18 of the teeth 21 has a base 40 with an outer diameter that is substantially equal to the diameter of the dowel bore 34 within which the pin end 18 is adapted to be inserted. The diameter of the base 42 of the truncated cone section 44 immediately adjacent to section 38 has a diameter which is diametrically increased by .005 inches, that is the radial clearance 46 is .0025 inches. Similarly, the diameter of the bases of each succeeding cone section is increased by .005 inches over the preceeding truncated cone section. For example, the base 48 of the truncated cone 50 has a radial clearance 52 of .0025 inches with respect to the outer edge of the base 42, and thus the diameter of the base 48 has been increased .005 inches above the diameter of the base 42. Similarly, the base 54 of the truncated cone section 56 has a radial clearance 58 of .0025 inches with respect to the base 48. The base 60 of the truncated cone section 62 has a radial clearance 64 of .0025 inches greater than the diameter of the base 54. The base 66 of the truncated section 68 has a radial clearance 70 of .0025 inches above the base 60.

The preferred diametrical increase of .005 inches between each successive base of the truncated cone sections forming the teeth 21 is the preferred size; however, it is to be understood that the diameter of each of the base sections may be made greater than or less than the preferred diametrical clearance of .005 inches depending upon the size of the pin 10 and the particular application. The edges of the bases of each of the truncated cone sections define a taper extending from the mid-section 14 to the opposite ends 16 and 18 such that when the pin 10 is inserted within a dowel hole, the pin 10 will be inwardly compressed so that the opposing surfaces 72 and 74 (FIG. 3) of slot 22 will be moved toward each other. Due to the resiliency of the material from which the pin 10 is fabricated, the material will tend to expand outwardly to its original shape whereby the circular edges of the large diameter bases of each of the truncated cone sections lockingly engage the wall of the dowel bores with a substantial force that is equal to or greater than the force obtained by the use of adhesive in combination with a wooden dowel pin. Thus, the dowel pin 10, when engaged in the aforementioned manner with a dowel hole, will retain two wooden members together until forcefully separated.

In the preferred embodiment, the dowel pin 10 is fabricated from a resilient material such as a suitable plastic, all of which is well known to those skilled in the art of plastics and comparable materials in light of the disclosed dowel pin 10.

It can thus be seen that the present invention has provided an extremely simple dowel pin adapted to join two wooden members without the need of an adhesive.

Although only one example of the present invention has been disclosed, it should be understood by those skilled in the art of dowel pin and wood joint assemblies that other forms may be had, all coming within the spirit of the invention and the scope of the appended claims.

What is claimed is as follows:

1. A dowel pin for connecting two members, each having aligned dowel holes, said dowel pin comprising an elongated body fabricated from a resilient material, the opposite ends of said dowel body being insertable into said dowel holes to join said members together, said body having a plurality of end-to-end longitudinally aligned truncated cone sections extending from the mid-section of said body to the opposite ends of said body, the larger circular bases of each truncated cone section at the opposite ends of said body having outer diameters that are substantially equal to the dowel holes within which said dowel pin ends are insertable, each larger circular base of each successively inwardly spaced truncated cone section from said end circular bases having outer diameters that are each successively greater than the diameters of said first mentioned larger circular bases by predetermined amounts; the conical surface of each of said truncated cone sections being inclined toward the ends of said body; said mid-section of said dowel body being of a uniform cylindrical shape, the opposite flat ends of which carry the largest diametered circular bases of the inwardly most aligned truncated cone sections, said mid-section having an outer diameter which is less than the diameter of either of said last mentioned truncated cone section circular bases; a longitudinal slot extending the full longitudinal length of said dowel pin thru the opposite ends of said dowel pin, said body being fabricated from a resilient material, such that said dowel pin peripheral surface adjacent said slot is inwardly compressed as said dowel pin is inserted within said dowel holes, said dowel body exerting an outward force on the larger circular bases of each of said truncated cone sections to lockingly engage said cone sections with the walls of said dowel holes.

2. The dowel pin defined in claim 1 wherein said dowel pin is fabricated from a plastic material.

* * * * *